Aug. 8, 1961
G. BOTTE
2,994,991
MACHINE FOR SHAPING THE RECTILINEAR EDGE FACES OF GLASS
SHEETS BY MEANS OF A CYLINDRICAL GRINDING DRUM
Filed May 28, 1958
3 Sheets-Sheet 1
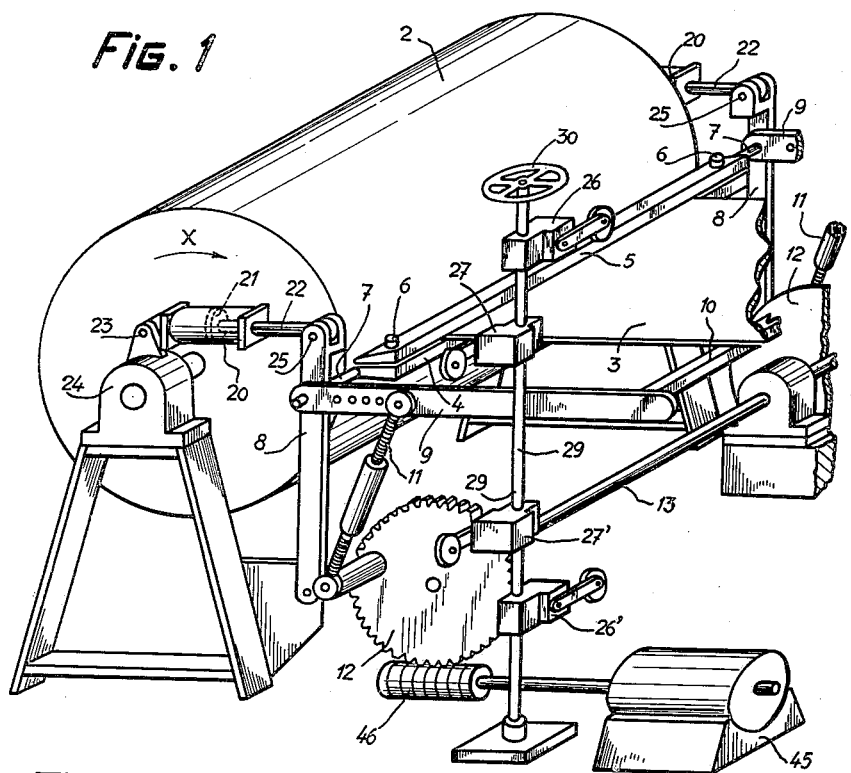
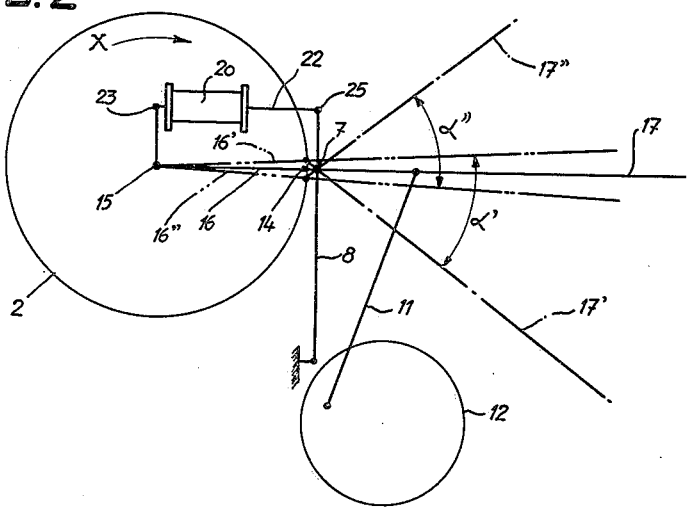
INVENTOR.
GASTON BOTTE
BY
Irwin S. Thompson
ATTY.

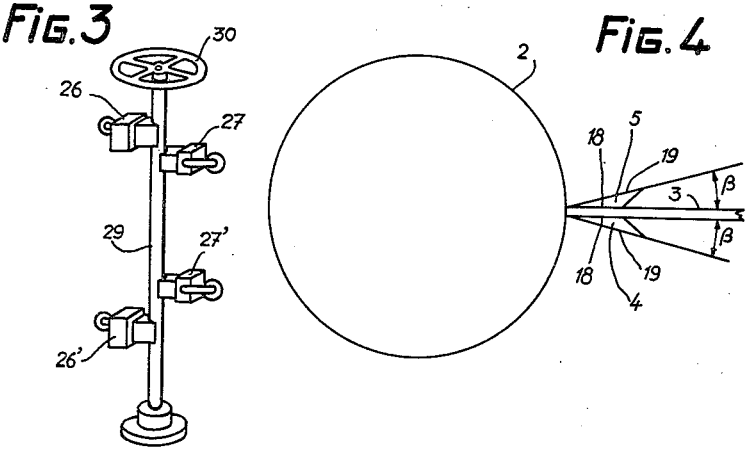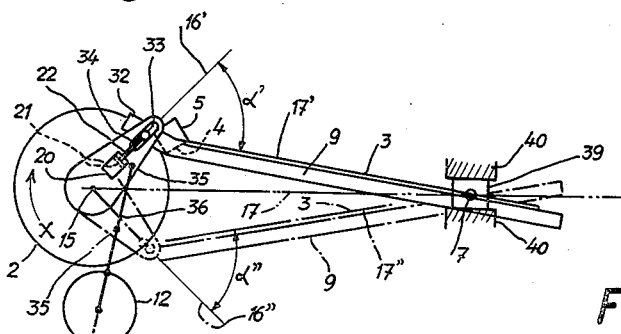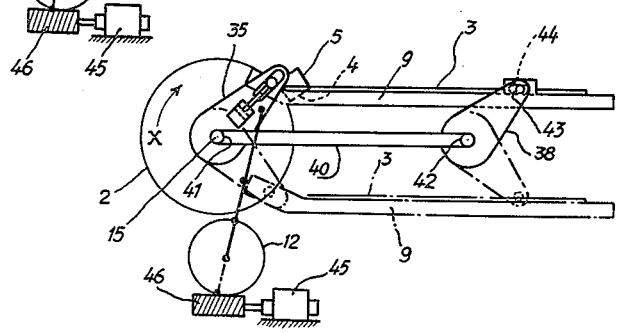

United States Patent Office 2,994,991
Patented Aug. 8, 1961

2,994,991
MACHINE FOR SHAPING THE RECTILINEAR EDGE FACES OF GLASS SHEETS BY MEANS OF A CYLINDRICAL GRINDING DRUM
Gaston Botte, 32 Rue des Trois Freres Servais, Jemeppe-sur-Sambre, Belgium
Filed May 28, 1958, Ser. No. 738,515
Claims priority, application Belgium May 29, 1957
1 Claim. (Cl. 51—96)

The present invention relates to a machine for shaping the rectilinear edge surfaces of glass sheets by grinding them by means of a cylindrical grinding stone or grinding drum, in which the glass sheet is borne by a movable support which, from a position for which the middle-plane of the glass sheet coincides with a plane passing through the axis of the drum and through a generatrix of the latter situated in the middle of the zone ground, makes an angle between the two planes while the sheet is thrust resiliently towards the drum along a generatrix of the latter and is prevented from being drawn along by this grinding drum by means of a stop situated near the grinding drum at the side of the mid-plane of the glass sheet towards which the drum turns.

In the present specification the expression "axial grinding plane" which will be used further on designates a plane containing the axis of the grinding drum and a generatrix on the latter substantially in the middle of the surface or zone of the glass sheet which is, at the moment considered, in contact with the grinding drum.

By "resilient thrust" a thrust must be understood which, although continuous, allows the glass sheet to move away from the axis of the grinding drum when such a removal is indispensable as a result of the relative movements between the middle plane of the glass sheet and the axial plane. A thrust of this kind is effected for example by a spring or a pneumatic piston.

Experience has shown that when a round grinding of the edge surface was attempted by inclining the glass sheet towards the side of the axial grinding plane towards which the grinding drum turns, the glass sheet thrust parallel to its plane slid easily in contact with the latter in the opposite direction to the latter's rotation. Thereby the glass sheet left the stop provided in the known way, to prevent its being drawn along by the grinding drum and chattered on it when the position corresponding to a flat grinding was slightly exceeded.

The present invention has for its object a machine intended to remedy this drawback.

The machine according to the invention is characterised in that the said support is displaceable in relation to the grinding drum so as to make the middle plane of the glass sheet pass from one side to the other of the said axial plane, while a second stop is fitted opposite said first stop so as to prevent the glass sheet from moving away from the latter when situated at the same side of said axial plane as the first stop and in that the surface of each of the two stops opposite the glass sheet makes, with the surface of the considered stop situated opposite the grinding drum, an angle which is at the maximum the complement of the maximum angle which the middle plane of the glass sheet can make with the axial grinding plane on the corresponding side of the position for which these two planes coincide.

The angle between said two surfaces of each stop is indispensable for preventing the extremity of the glass sheet from presenting, on contact with the grinding drum, considerable overhang relatively to the stop considered.

Experience has also shown that when a glass sheet was ground by means of this machine, scales still sometimes occurred in the surface opposite that by which the grinding drum reaches the grinding zone, if the intersection edge between this surface and the edge surface of the glass sheet had not previously been ground.

A grinding of this type has so far only been possible by placing the glass sheet obliquely with the edge line to be ground facing upwards, against a grinding drum movable from top to bottom to the place of grinding. In other terms, in order to avoid the formation of scales with certainty the glass sheet must nevertheless be turned over before it is made to oscillate on both sides of its corresponding flat grinding position. This turning over of the sheet is the same as that always effected in the course of a round grinding when the glass sheet is made to pivot by hand or during a flat grinding when the glass sheet is supported from behind either by hand or by means of a support pushing the sheet towards the axle of the grinding drum.

The present invention has for its object an additional characteristic by means of which a flat or rounded grinding of the edge surface without scales can be effected without turning the glass sheet over.

To this end the glass sheet support is movable so as to make the middle plane of the sheet balance until in a position for which it makes an angle of at least 30° and preferably at least 40° with the axial grinding plane and on the side of the latter towards which the grinding drum turns.

Contrary to what might have been supposed from the basis of a grinding under a much smaller angle, no scales are produced along the opposite surface to that from which the grinding drum comes.

It must however be noted that if the glass sheet has a lamina projecting at the place to be ground, the pressure with which it is pushed towards the axle of the grinding drum must be moderated until this lamina is worn down. This drawback can be remedied by inclining the glass sheet until it makes at least an angle of 40° with the axial grinding plane. With such an angle one no longer has to give one's attention to the appearance of the glass sheet at the place to be ground to apply the same pressure from the beginning of the grinding operation as that used after the grinding has already been partially effected.

In order to allow a symmetrical grinding of the edge surface to be effected, the movement of the glass sheet support is provided with an amplitude such that the middle plane of the glass sheet may come to form an angle with the axial grinding plane and on the side of this latter plane by which the grinding drum reaches the grinding zone, which is substantially equal to the maximum angle possible on the opposite side of the axial grinding plane.

According to an advantageous form of construction the glass sheet support is fitted with means which immobilise the glass sheet in relation to it. Preferably, said stops grip the glass sheet near the grinding drum on the whole of its length, and immobilise it in relation to the mobile support on which they are mounted. Thus any displacement of the glass sheet in relation to its stops is avoided, and consequently the risks of surface deterioration are abolished. The gripping of the glass sheet by the two stops on the whole length of the glass sheet and very close to the edge to be ground, as well when done in a discontinuous as in a continuous way, lessens the vibrations of the glass sheet which may bring about breakage or the formation of scales especially along the opposite surface to the one from which the grinding drum comes.

According to an additional characteristic applicable in the case where the glass sheet is borne by a support oscillating about a pivot while it is pushed elastically against the grinding drum towards the axis of the latter, this pivot is at a distance from the axis of the grinding drum greater than the radius of the latter.

It must be noted that when the axis of the pivot of the oscillating support passes outside the grinding drum, the oscillation of the glass sheet gives rise to a displacement of the extremity of the latter alternately in the rotation direction of the grinding drum and in the opposite direction and that this displacement is accompanied by a bringing together and distancing movement of the glass sheet from the grinding drum axis for each pivoting direction. At the same time the axial grinding plane shifts in the space in a direction such that the angle of oscillation of the glass sheet in relation to its middle position may be reduced although the angle with the axial plane is maintained. The reduction of the angle of the oscillation is the larger the further away the pivot is from the grinding drum. This constitutes an important advantage for the grinding of long glass sheets because the pivot can then rest at a distance from the ground which does not modify the placing and removal positions of the sheet. It is for this reason that in certain forms of construction, the pivot is at a distance from the grinding drum axis at least equal to twice the radius of the drum.

In an especially simple form of construction, applicable when the axis of the pivot passes outside the grinding drum, the extremity of the said oscillating support adjacent to the grinding drum is articulated to a pivot radially movable in a crank subjected to an alternate rotation movement about an axis coinciding with that of the grinding drum, the said pivot being elastically urged towards this axis.

According to another characteristic of the machine of the invention, this machine is provided with at least one pair of stops bringing about the reversal of the engine-running direction when the glass sheet support encounters them.

In particular when one wishes to be able quickly to modify the shape of the round grinding of the edge surface, one uses a machine having several pairs of stops of this kind, corresponding to different oscillation amplitudes of glass sheet support, these pairs of stops being mounted on a movable support so that one can by selection bring any one of these pairs of reversal-stops onto the trajectory of the glass sheet support while the other reversal stops are outside this trajectory.

Other characteristics and details of the invention will appear in the course of the description of the drawings annexed to the present specification which represent schematically and only by way of example, different forms of construction of the machine according to the invention.

FIGURE 1 is a view in perspective of a first form of construction.

FIGURE 2 is a diagram showing the maximum angles which a glass sheet borne by a machine according to FIGURE 1 can make with the axial grinding plane.

FIGURE 3 is a view in perspective of a member bearing two pairs of reversers of the running direction of the engine operating the glass sheet support, these pairs of reversers being able to be brought separately onto the trajectory of this support.

FIGURE 4 shows schematically a detail of the gripping members of the sheet on its oscillating support.

FIGURE 5 shows in elevation a second form of construction of this machine allowing the change of the glass sheet's inclination in the space to be considerably reduced without decreasing its change of inclination in relation to the axial grinding plane.

FIGURE 6 shows diagrammatically in elevation another variant of the machine according to the invention in which the glass sheet remains parallel to itself in the course of the rounded grinding of one of its edge surfaces.

Figure 7:
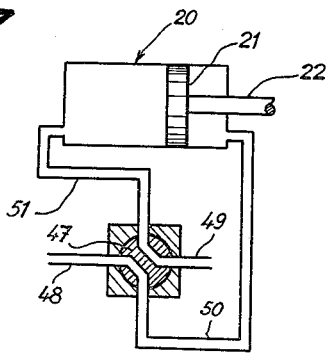
FIGURE 7 shows the control means of the displacements of a pneumatic piston which pushes elastically the glass sheet against the grinding drum towards the axis of the latter.

In these different figures, the same reference notations refer to the same members.

The machine represented in FIGURE 1 has a cylindrical grinding drum 2 rotating in the direction of a arrow X and driven by an engine not shown. A glass sheet 3 to be ground is gripped between two stops 4 and 5 extending continuously or discontinuously along the whole length of the glass sheet. These stops are shown in the form of continuous strips between which the glass sheet is gripped by bolts 6. The strip 4 is borne by a pivot 7 mounted in rocking bars 8. This pivot is integral with two arms 9 joined by a beam 10 on which the back of the glass sheet 3 rests.

The sheet support constituted by the parts 4, 5, 7, 9, and 10 is driven with an oscillating movement around the axis of the pivot 7 by connecting rods 11 of adjustable length connected to discs 12 fixed on a shaft 13 and of which one disc is in the form of a toothed wheel, rotated by an engine 45 by means of an endless screw 46 having the function of a speed reducer. The engine 45 is an electric motor the direction of rotation of which is periodically reversed so as to make the shaft 13 turn alternately.

In the position shown in FIGURE 1 the middle plane of the sheet is coincident with the plane passing through the axis of the grinding drum and through the generatrix of the latter situated half-way up to the ground zone of the glass sheet. In FIGURE 2, this generatrix is designated by 14. The axial grinding plane is determined by this generatrix and the axis 15 of the grinding wheel and is designated by 16. The middle plane of the glass sheet is designated by 17.

In the course of the rotation of the discs 12, the glass sheet oscillates about the axis of the pivot 7, and its extremity in contact with the grinding drum shifts slightly in height upon contact with this grinding drum due to the fact that the axis of the pivot 7 is at a distance, from the axis 15 of the grinding drum, greater than the radius of the latter by a quantity at least equal to that by which the glass sheet wears down during its grinding. This quantity is for example 1 to 2 centimeters.

In the course of the oscillation of the glass sheet, the middle plane of the latter may occupy an extreme position, such as 17′ making with the corresponding axial grinding plane 16′ an angle α′ greater than 40 degrees. This angle α′ is situated on the side of the axial plane 16′ towards which the grinding drum turns.

The strip or stop 5 which is arranged facing the strip or stop 4 prevents the glass sheet from separating from the latter while it is inclined in the direction which has just been considered. The strip 5 also prevents the glass sheet from chattering when the middle plane of the latter is in the vicinity of the axial grinding plane. The strip 4 fulfils, with regard to the glass sheet, the normal function of a stop on which the glass sheet rests when hand grinding is done by inclining it on the side of the axial grinding plane by which the grinding drum reaches the grinding zone. The maximum angle that the glass sheet can make on this side with the axial grinding plane 16″ is designated by α″. This angle is substantially equal to the angle α′ above.

By the fact that the strips 4 and 5 which serve as stops for the glass sheet are mounted on the oscillating support of the latter, the form chosen for these strips is such that the angle β (FIGURE 4) between their parallel surfaces 18 facing each other and in contact with the glass sheet and their surfaces 19 facing the grinding drum, is equal to the maximum of 50 degrees. This angle can never be greater than the complementary angle of the maximum angle of inclination between the middle plane of the sheet or said parallel surfaces and the corresponding axial grinding plane. Due to this characteristic the strips 4 and 5 forming stops for the glass sheet can be arranged in the vicinity of the grinding drum 2 without these strips encountering the grinding drum in the course of the oscillation of the glass sheet support and at the same time a large overhang of the glass sheet between these stops and the ground surface is avoided. With the aim of reducing the vibrations of the glass sheet under the effect of the grinding the strips 4 and 5 grip the glass sheet along its whole length and very close to the edge surface of the glass sheet to be ground. The surfaces of the two strips 4 and 5 in contact with the two surfaces of the glass sheet are covered with a damping substance such as rubber.

In the course of the oscillating movement of the glass sheet the latter is resiliently maintained in contact with the grinding drum by the fact that compressed air is applied in the cylinders 20 on one surface of pistons 21 joined by rods 22 to the corresponding rocking bars 8. These rods 22 are, for example, articulated at 25 to the rocking bars 8. The direction in which the glass sheets are pushed towards the grinding drum remains always directed approximately towards the axis of the latter.

In FIGURE 7, the control of a pneumatic piston such as the piston 21 of FIGURE 1 has been shown. A four-way valve 47 is in communication with a duct 48 through which air under pressure is admitted, with an escape duct 49 and ducts 50 and 51 communicating with the ends of the cylinder 20. In the position shown the air under pressure passes from duct 48 into the right end of the cylinder while the air on the other side of the piston can escape into the atmosphere. If the valve 47 is turned through 90 degrees, it is the left end of the cylinder which receives the pressure of the compressed air while the air in the right end can escape through duct 49 to the atmosphere.

With such a machine the whole grinding operation can be done without the glass sheet having to be turned over, as is necessary during manual grinding. In fact, it is sufficient to bring the glass sheet towards the axis of the grinding drum with the intensity desired for the grinding, between positions such as 17' and 17" for which the angles α' and α" are of at least 40 degrees up to the moment where the round grinding of the edge surface is obtained.

A continuous oscillation of this kind can be automatically effected by the use of pairs of stops arranged on the trajectory of the glass sheet support and which reverse the running direction of the engine which propels this support when the latter encounters them.

In FIGURES 1 and 3, two pairs of stops of this kind have been shown, designated respectively by 26 and 26' and by 27 and 27'. These pairs of stops are borne by a movable support constituted by a rod 29 which can be brought into different angular positions by means of a hand wheel 30. The two pairs of stops are mounted on this support so that one can at will bring any one of these pairs into the trajectory of the glass sheet support while the stops of the other are outside this trajectory. As one can see from FIGURES 1 and 3, the stops 26 and 26' are spaced further from each other than the stops 27 and 27'. Consequently when the stops 26 and 26' are in the trajectory of the arm 9, the oscillation amplitude of the glass sheet is larger than when the stops 27 and 27' are in this trajectory. The passage from one oscillation amplitude to another can thus be made instantaneously.

Supposing that the reversal stops 26 and 26' correspond to a reversal of the running direction of the engine for which the middle plane of the glass sheet makes an angle of about 40 degrees with the axial grinding plane, it is sufficient to leave these stops in the trajectory of the arms 9 to obtain a well rounded grinding.

If a less pronounced grinding is desired, the reversal stops 27 and 27' are put in the trajectory of the arm 9. In practice, the grinding ought however to begin with the stops 26 and 26' during one or several movements of large amplitude of the glass sheet, so as to avoid the formation of scales.

When a flat grinding is desired, also without turning over the glass sheet, the engine, and consequently the movement of the mobile support, can be stopped by means of a switch, when the glass sheet occupies its two extreme symmetrical positions so as to blunt the two edges and then when the glass sheet substantially occupies its middle position with the aim of grinding its edge almost perpendicularly to its surface. This last middle position is furthermore favourable to the placing and removing of the glass sheet.

Figure 8:
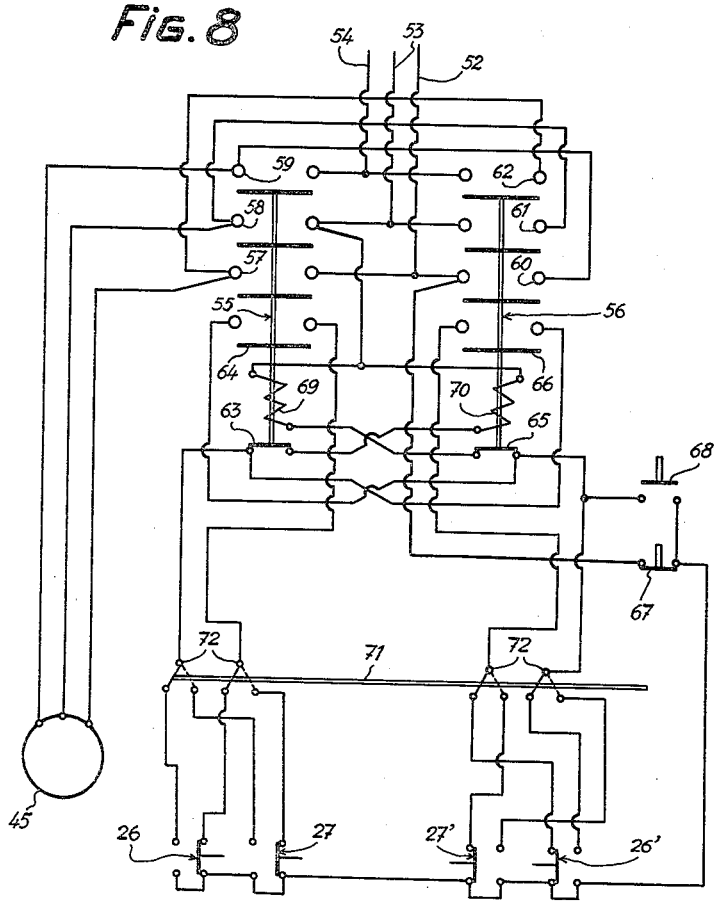
FIGURE 8 is a wiring diagram showing how reversal stops can make the rotation direction of a three phase motor to reverse.

The reversal stops such as 26 and 26' or 27 and 27' are constituted by double switches which make the direction of rotation of the motor 45 reverse, for example, in the known manner shown in FIGURE 8 in the case where the motor is a three-phase electric motor. The three phases of the mains are represented by conductors 52, 53 and 54 which are connected to contactors 55 and 56. The motor 45 is directly connected to terminals 57, 58 and 59 of the contactor 55 which may be respectively connected to the conductors 52, 53 and 54 by the closing of this contactor. The terminals 57, 58 and 59 are respectively connected to terminals 62, 61 and 60 of the contactor 56, which may be respectively connected to the conductors 52, 53 and 54 by the closing of this last contactor. It is thus seen that the motor 45 rotates in one direction or in the opposite direction according to the contactor 55 or 56 through which it is supplied.

The contactor 55 is provided with two supplementary contacts 63 and 64 which will be called hereinafter "locking contact" and "maintain contact." At rest, i.e. when the contactor 55 is open, the locking contact 63 is closed while the maintain contact 64 is open. Inversely, when the contactor 55 is closed, the contacts 63 and 64 are respectively open and closed. The contactor 56 is also provided with two supplementary contacts 65 and 66 which have, for this contactor, the same function as the contacts 63 and 64 for the contactor 55.

FIGURE 8 shows moreover a stop switch 67 and a start switch 68. These two switches are connected in series with the locking contact 65 and a winding 69 which, when a current flows through it, displaces the contactor 55 for placing it in the feeding position of the motor. A similar winding 70 is provided for the contactor 56 in order to close the latter when current flows through it.

The maintain contact 64 is connected, in series with one of the poles of the double switch 26, in shunt at the terminals of the start switch 68. This double switch is actuated by the arm 9 of FIGURE 1. When this arm is not in contact with the double switch 26, the latter is in the position shown for which it closes the circuit of the maintain contact 64 and opens the feeding circuit of the winding 70 which causes the opening of the contactor 56. When arm 9 pushes away the double switch 26, the latter occupies temporarily a position for which the circuit of the maintain contact 64 is open and the feeding circuit of the winding 70 is closed, which causes the closing of the contactor 56.

The maintain contact 66 is connected, in series with one of the poles of the double switch 26', in shunt at the terminals of the double switch 26 which are open at rest. This second double switch 26' is actuated by the arm 9. When this arm is not in contact with the double switch 26', the latter is in the position shown for which it closes the circuit of the maintain contact 66 and opens a switch connected in shunt on the circuit in which the maintain contact 64 and the contact of the double switch 26 which is closed at rest are connected in series. When arm 9 pushes away the double switch 26', the latter occupies then temporarily a position for which the circuit of the maintain contact 66 is open and the feeding circuit of the winding 69 is closed, which causes the closing of the contactor 55 and the reversal of the rotation direction of the motor.

From the inspection of the wiring diagram of FIGURE 8, it can be seen that if the start switch 68 is closed, the contactor 55 closes because the locking contact 65 of contactor 56 is closed at this moment. Consequently, the motor 45 starts in one direction. If the start switch 68 is no more maintained in its closed position a moment after it has been closed, the motor continues to rotate in the same direction because the contactor 55 continues to be fed by the circuit in shunt on this switch and which comprises the normally closed locking contact 65 and the maintain contact 64 which has just been closed during the closing of the start switch.

When arm 9 abuts against the double switch 26, the latter opens the circuit comprising the maintain contact 64, the locking contact 65 and the winding 69. Consequently, the contactor 55 opens and the locking contact 63 closes again. This displacement of the double switch 26 by the arm 9 causes simultaneously the closing of the circuit comprising the locking switch 63 and the winding 70 of the contactor 56. Thereby, the latter closes and causes the motor to rotate in the opposite direction. Simultaneously, the locking contact 65 opens and the maintain contact 66 closes. This last closing allows the feeding of the winding 70 to take place until the double switch 26' is pushed away by the arm 9, which opens the circuit of this winding, opens the contactor 56, closes again the locking contact 65 and allows again the feeding of the winding 69 and the closing of the contactor 55. Consequently, the motor 45 rotates again in the first direction.

These successive reversals continue until the stop switch 67 is open.

The same operations are effected if the double switches 27 and 27' are brought in the trajectory of the arm 9 in place of the double switches 26 and 26' and if these switches 27 and 27' are put into circuit while the switches 26 and 26' are put out of circuit by the displacement of a four-pole commutator 71 which is then placed in the position shown in dash and dot lines by the pivoting of its four poles about pivots 72.

In FIGURE 1, one also sees that the head of the connecting rods 11 can be articulated to the arms 9 at different distances from the axis of the pivot 7. This arrangement is provided to allow control of the speed of the oscillation movement. A similar control can be effected by varying the distance between the foot of the connecting rods 11 and the axis of the shaft 13.

In mounting the reversal stops on the rod 29 so that they can be shifted along the axis of the latter, the amplitude of the oscillation which they determine can easily be regulated. In addition by this means one can regulate the localisation of the movement in relation to the position for which the middle plane of the glass sheet and the axial grinding plane coincide.

Due to the fact that the glass sheet has a greater tendency to vibrate when its middle plane is adjacent to the axial grinding plane, it is expedient to make it pass fairly quickly into this zone.

In the form of construction represented in FIGURE 5, the extremity 32 of the arm 9 forming part of the glass sheet support which is adjacent to the grinding drum, is articulated to a pivot 33 radially movable in a crank 35 subjected to an alternate rotation movement about an axis 15 coinciding with that of the grinding drum 2. This pivot 33 is guided in a radial slideway 34 of the crank. The alternate movement is operated by a connecting rod 36 propelled by a toothed plate 12 alternately set in rotation. The arm 9 of the oscillating support pivots round a pivot 7 situated at a distance from the axis of the grinding drum which is greater than the diameter of the latter. This pivot is borne by a slide block 39 which can be displaced in a guide 40 radially directed in relation to the grinding drum.

In the position represented, the angle $\alpha'$ between the direction of the axial grinding plane 16' and that of the middle plane of the glass sheet 17' is more than 40 degrees although the angle between the directions 17' and 17 is less than 10 degrees. In order to attain the symmetrical position shown in dotted and dashed lines the angle of oscillation of the glass sheet 3 can therefore be less than 20 degrees instead of being at least equal to 80 degrees in the form of construction represented in FIGURES 1 and 2.

In the form of construction represented in FIGURE 6, the glass sheet support is displaced parallel to itself although a variation of the angle between the middle plane of the glass sheet and the axial grinding plane does occur.

This is obtained by means of the fact that the arms 9 of this support are not only borne by cranks such as 35 but also by cranks such as 38 equal and parallel to the first ones. The cranks 35 and 38 undergo the same oscillation movements. To this end they are mechanically joined to each other, for example by a chain 40 passing over toothed wheels 41 and 42 integral with these cranks.

As can be seen from FIGURE 6, the mechanical connection between the arms 9 and the cranks 38 is effected by the aid of a trunnion 43 sliding in an opening 44 in these arms in the course of the grinding.

In the forms of construction represented in FIGURES 5 and 6, the glass sheet support is constantly urged radially in relation to the grinding drum under the effect of a pneumatic pressure applied to the pistons 21 movable in the cylinders 20 borne by the cranks 35.

Obviously the invention is not limited exclusively to the forms of construction shown and many modifications can be made in the form, the arrangement and the construction of certain of the parts occurring in its realisation, without going beyond the extent of the present invention, on condition that these modifications do not contradict the object of the following claim.

What I claim is:

A machine for grinding a rectilinear edge surface of a sheet of glass, comprising a rotating cylindrical grinding drum having a fixed axis, an oscillatable sheet glass support having an axis of oscillation parallel to the axis of the grinding drum and having a sheet glass-receiving surface parallel to and substantially coplanar with the oscillating axis, means for oscillating said support to alternately shift the surface of the glass-receiving surface from one side of a plane passing through the axis of the drum and the axis of oscillation of the support to the other side of said plane, means resiliently urging one end of the support towards the grinding drum, and means on the end of the support adjacent the drum for fixing a sheet of glass thereon.

References Cited in the file of this patent

UNITED STATES PATENTS

| | | |
|---|---|---|
| 327,934 | Frech | Oct. 6, 1885 |
| 760,038 | Stuz | May 17, 1904 |
| 941,529 | Myers | Nov. 30, 1909 |
| 2,293,515 | Littwin | Aug. 18, 1942 |
| 2,425,234 | Erwin et al. | Aug. 5, 1947 |
| 2,598,405 | Marchand | May 27, 1952 |
| 2,691,255 | Blazek | Oct. 12, 1954 |